United States Patent
Wang et al.

(10) Patent No.: US 11,740,881 B2
(45) Date of Patent: Aug. 29, 2023

(54) METHOD FOR IMPLEMENTING COMPILED EMBEDDED PYTHON

(71) Applicant: SOOCHOW UNIVERSITY, Suzhou (CN)

(72) Inventors: Yihuai Wang, Suzhou (CN); Mingyu Xu, Suzhou (CN); Huiming Shuai, Suzhou (CN); Wensen Yu, Suzhou (CN); Chuanghua Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/786,502

(22) PCT Filed: Dec. 29, 2020

(86) PCT No.: PCT/CN2020/140482
§ 371 (c)(1),
(2) Date: Oct. 21, 2022

(87) PCT Pub. No.: WO2022/099888
PCT Pub. Date: May 19, 2022

(65) Prior Publication Data
US 2023/0075927 A1 Mar. 9, 2023

(30) Foreign Application Priority Data

Nov. 11, 2020 (CN) .......................... 202011253208.6

(51) Int. Cl.
*G06F 8/40* (2018.01)
*G06F 8/41* (2018.01)

(52) U.S. Cl.
CPC .................... *G06F 8/427* (2013.01)

(58) Field of Classification Search
CPC ... G06F 8/427; G06F 9/45529; G06F 9/44521
See application file for complete search history.

(56) References Cited

U.S. PATENT DOCUMENTS 7,010,580 B1 * 3/2006 Fu ...................... G06F 21/6218
709/217
10,831,456 B1 11/2020 Bhownani et al.
(Continued)

FOREIGN PATENT DOCUMENTS

CN   102902540 A   1/2013
CN   104182267 A   12/2014
(Continued)

OTHER PUBLICATIONS

Zte, "Compiling Method, Interpreting Method, Interpreting Device and User equipment," CN104182267, 2014, machine translation, pp. 1-4. (Year: 2014).*

(Continued)

*Primary Examiner* — Hanh Thi-Minh Bui
(74) *Attorney, Agent, or Firm* — SZDC Law P.C.

(57) ABSTRACT

Provided is a method for implementing compiled embedded Python. The method comprises: traversing an abstract syntax tree of Python source code to obtain semantic information about a program and generating corresponding C++ code according to said semantic information (S1); performing type annotation of the Python source code and thus generating C++ variable definitions and function definitions (S2); using a translator to translate into C++ source files the Python source code processed in the steps described above (S3); storing said C++ source files together with embedded chip-related files to form a file package, and compiling and linking said file package and generating an ASCII text file (S4). The method implements a source code translator on the basis of type annotations and static analysis, and integrates the translator into an embedded platform, enabling the editing, compiling, linking, and programming of Python source files.

8 Claims, 3 Drawing Sheets

(56) References Cited

U.S. PATENT DOCUMENTS

2008/0098377 A1* 4/2008 Barnak ............... G06F 9/44521
717/162
2019/0339947 A1* 11/2019 Mccune ................... G06F 8/34

FOREIGN PATENT DOCUMENTS

| CN | 111142876 A | 5/2020 |
|---|---|---|
| CN | 111249736 A | 6/2020 |

OTHER PUBLICATIONS

M. Bysiek, A. Drozd and S. Matsuoka, "Migrating Legacy Fortran to Python While Retaining Fortran-Level Performance through Transpilation and Type Hints," 2016, Salt Lake City, UT, USA, 2016, pp. 9-18, doi: 10.1109/PyHPC.2016.0 (Year: 2016).*

* cited by examiner

METHOD FOR IMPLEMENTING COMPILED EMBEDDED PYTHON

This application is the National Stage Application of PCT/CN2020/140482, filed on Dec. 29, 2020, which claims priority to Chinese Patent Application No. 202011253208.6, filed on Nov. 11, 2020, which is incorporated by reference for all purposes as if fully set forth herein.

FIELD OF THE DISCLOSURE

The present invention relates to the field of computer technologies, and particularly to a method for implementing compiled embedded Python.

BACKGROUND OF THE DISCLOSURE

MicroPython is an ultra-small Python interpreter which may run on Windows systems, Unix systems and some microcontrollers, compresses a huge Python interpreter to less than 256 KB and may support most Python3 functions. Python has better readability and reliability than C, and MicroPython may effectively improve a programming efficiency. The Python interpreter occupies a larger Flash space and more computing resources, and is not suitable for developing embedded applications with low resource occupation and high real-time requirements.

Currently, Cython and PyPy provide two tools for improving a running efficiency of Python respectively, but both are only suitable for the field of desktop system programming technologies and may not be suitable for microcontrollers. Cython provides a method in which static functions are written according to Python-like syntax or referenced for the Python interpreter to call, and the method is again essentially based on the interpreter and therefore not suitable for a microcontroller programming operation. PyPy provides a Python just-in-time (JIT) compilation technology, and translates required functions into native codes during runtime to improve a running efficiency, but the runtime of the JIT compilation technology contributes to total runtime, and meanwhile, huge memory overhead is caused, and therefore, the JIT compilation method is also not suitable for the microcontroller.

Therefore, in order to solve the above technical problems, it is necessary to provide a method for implementing compiled embedded Python, which may satisfy a real-time performance and be applied to the microcontroller.

SUMMARY OF THE DISCLOSURE

In view of this, an object of an embodiment of the present invention is to provide a method for implementing compiled embedded Python. With the method for implementing compiled embedded Python according to the embodiment of the present invention, a source code translator is implemented based on type hinting and static analysis, and integrated into an embedded platform, so as to edit, compile, link and burn a Python source file.

In order to achieve the above object, the technical solution provided by an embodiment of the present invention is as follows:

A method for implementing compiled embedded Python, comprising:

step S1: traversing an abstract syntax tree of a Python source code to obtain semantic information of a program and generating a corresponding C++ code according to the semantic information;

step S2: performing type hinting on the Python source code to generate a variable definition and a function definition of C++;

step S3: translating the Python source code processed in step S1 and step S2 into a C++ source file using a translator; and step S4: storing the C++ source file and a file related to an embedded chip together to form a file package, and compiling and linking the file package to generate an ASCII text file.

As a further improvement of the present invention, wherein the file related to an embedded chip comprises a header file, a start-up file and a link file.

As a further improvement of the present invention, wherein the type hinting comprises variable hinting and function hinting, the variable hinting comprises the steps of: giving a type of a single variable in the Python source code while assigning a value to the variable, so as to generate a corresponding C++ variable definition; and the function hinting comprises the steps of: giving a type of a parameter in a function in the Python source code and a type of a return value of the function while defining the function, so as to generate a corresponding C++ function definition.

As a further improvement of the present invention, wherein a design process of the translator comprises:

step S31: defining a structure of translation content, the structure comprising a header file containing region, a namespace definition region and a source code region;

step S32: designing a relationship of mapping from Python types to C++ types; and step S33: using a bottom-up method to semantically analyze the ASR and generate C++ codes, and splicing the generated C++ codes according to the structure of the translation content.

As a further improvement of the present invention, wherein the mapping relationship is shown in the following table, x, y∈T, and T={int, float, str, bytes, bool},

TABLE 1

| Type of hint | Type after translation |
|---|---|
| int | int |
| float | float |
| str | string |
| bytes | vector<char> |
| bool | bool |
| List[x] (list type) | vector<f(x)> |
| Tuple[x] (tuple type) | vector<f(x)> |
| Set[x] (set type) | set<f(x)> |
| Dict[x,y] (dictionary type) | map<f(x),f(y)> |

As a further improvement of the present invention, wherein the step S33 comprises:

step S331: performing expression translation in a manner of accessing child nodes from bottom to top; and step S332: translating a statement or/and each program code line in a statement list into a C++ code statement.

As a further improvement of the present invention, wherein in the translation process of the step S332, the statements are required to be first divided into a function definition statement and a non-function definition statement, a C++ code statement into which the function definition statement is translated correspondingly is imported into other action scope statement regions, and a C++ code statement into which the non-function definition statement is translated correspondingly is imported into a function body of the action scope where it is located.

As a further improvement of the present invention, wherein the abstract syntax tree is a list of node objects, each object comprises a number of sub-lists or reference to other objects, and each list or sub-list comprises any number of node objects.

As a further improvement of the present invention, wherein a process of obtaining the abstract syntax tree of the Python source code comprises the steps of: calling a parse( ) function of an abstract syntax tree module, and using a dump( ) function to convert the abstract syntax tree of the Python source code obtained by the parse( ) function into a natural language form.

As a further improvement of the present invention, wherein when the ASCII text file is applied to an embedded platform, a C or other-language encapsulation module is used to implement an IO operation.

The present invention has the following advantages.

With the method for implementing compiled embedded Python according to the embodiment of the present invention, the source code translator is implemented based on the type hinting and the static analysis, and integrated into the embedded platform, so as to edit, compile, link and burn the Python source file, and break through a defect that Python may not be applied to the field of the embedded platforms in real time in a prior art.

BRIEF DESCRIPTION OF DRAWINGS

In order to more clearly explain the technical solutions of the embodiments of the present invention or the prior art, the drawings to be used in the descriptions of the embodiments or the prior art are briefly introduced as follows. Apparently, the following drawings merely illustrate some embodiments of the present invention, and a person skilled in the art can obtain other drawings from these drawings without any creative effort.

DETAILED DESCRIPTION OF PREFERRED EMBODIMENTS

In order to make those skilled in the art better understand the technical solutions in the present invention, the following clearly and completely describes the technical solutions of the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
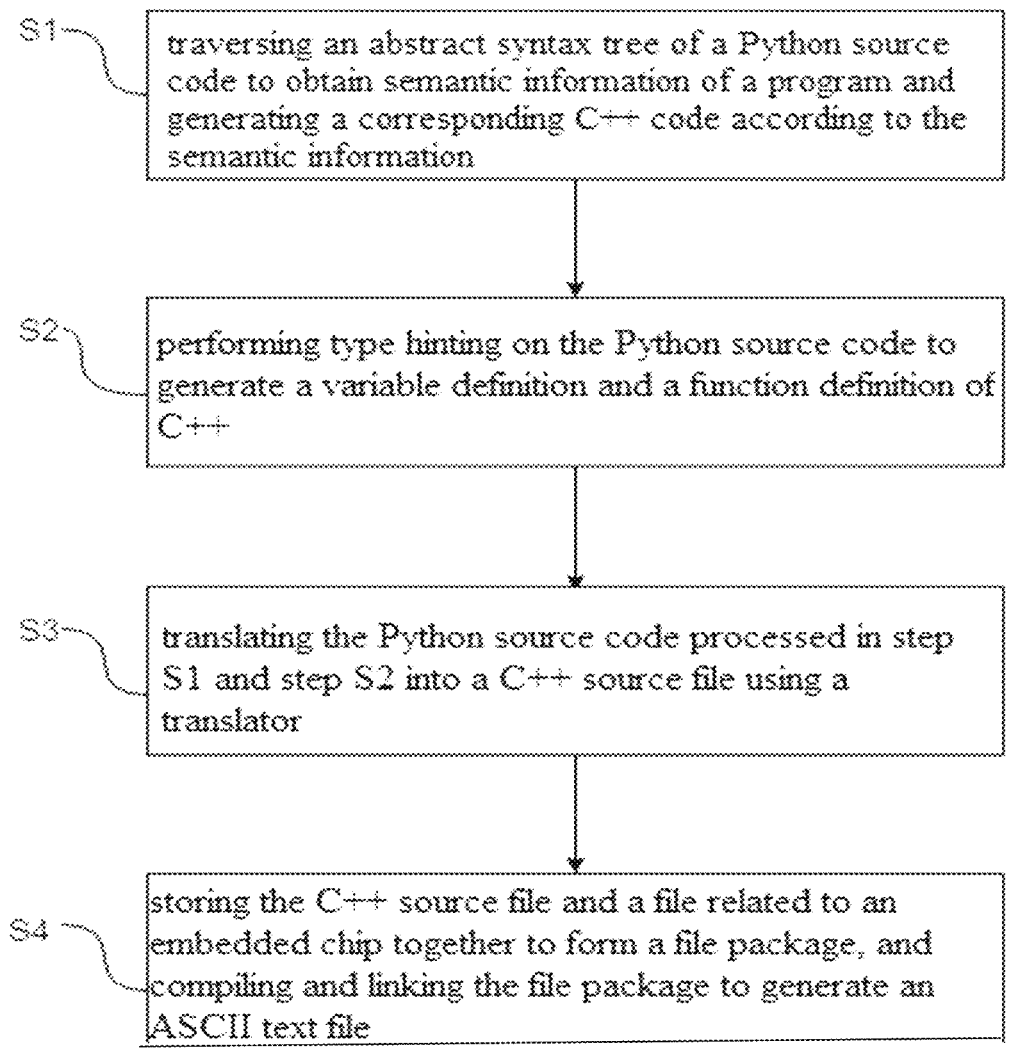
FIG. 1 is a schematic flow chart of a method for implementing compiled embedded Python according to an embodiment of the present invention.
Figures 2, 3:
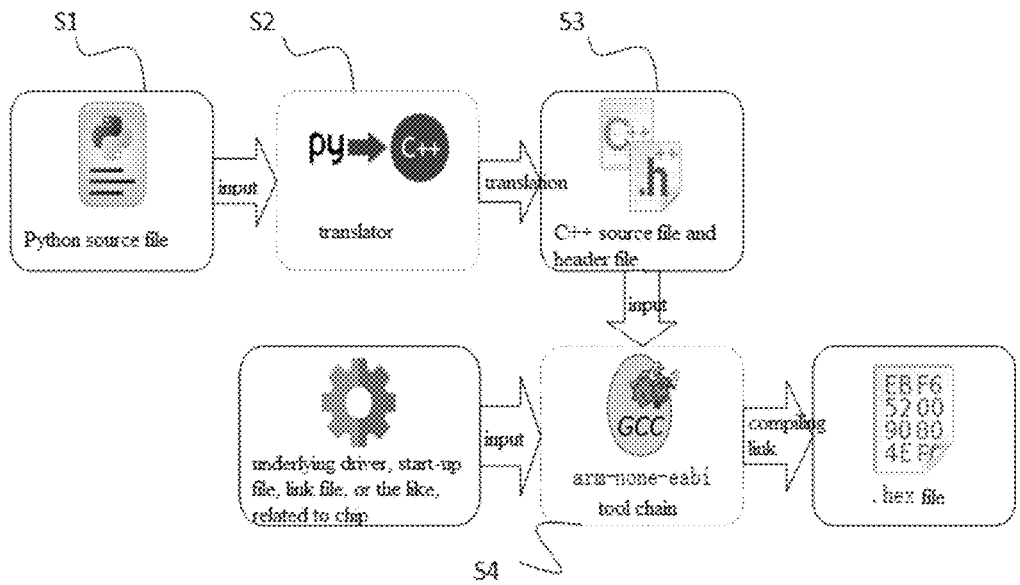
FIG. 2 is a schematic flow chart of another expression in the embodiment shown in FIG. 1.
FIG. 3 is a schematic diagram of a successful compiling interface in E-Python-AHL-GEC-IDE using the method for implementing compiled embedded Python according to the embodiment of the present invention.

FIGS. 1 and 2 show schematic flow charts of a method for implementing compiled embedded Python according to an embodiment of the present invention. In the present embodiment, the method for implementing compiled embedded Python includes four steps, and specific content of each step is as follows.

Step S1: traversing an abstract syntax tree (AST) of a Python source code to obtain semantic information of a program and generating a corresponding C++ code according to the semantic information.

The AST is an intermediate representation from a source code to an object code, and describes a program structure with a tree structure. The AST of Python may be represented as a list of node objects, each object contains a number of sub-lists or reference to other objects, and each list or sub-list contains any number of node objects. The AST of Python is obtained by calling a parse( ) function of an AST module and may be converted to a natural language form using a dump( ) function. Table 1 shows an AST for a Python function and a call thereof.

TABLE 1

AST for Python function and call thereof command prompt-python ----- □ X
C:\Users\65301>python
Python 3. 7. 6rc1 (tags/v3. 7. 6rc1:bd18254b91, Dec 11 20
19, 20:31:07) [MSC v. 1916 64 bit (AMD64) ] on win32
Type "help", "copyright", "credits" or "license" for
more information.
>>> import ast
>>> module="""
... def add(a, b) :
...     return a+b
... print (add (3, 4) )
... """
>>> ast_get=ast. parse (module)
>>> ast. dump (ast_get)
"Module(body=[FunctionDef (name=' add' , args=arguments(
args= [arg (arg=' a' , annotation=None) , arg(arg=' b' , ann
otation=None) ], vararg=None, kwonlyargs= [ ], kw_defaul
ts=[ ], kwarg=None, defaults=[ ] ), body=[Return (value=B
inOp (left=Name (id=' a' , ctx=Load( ) ), op=Add( ), right=N
ame(id=' b' , ctx=Load( ) ) ) ], decorator_list= [ ], return
s=None) , Expr (value=Call (func=Name (id=' print' , ctx=Lo
ad( ) ), args=[Call (func=Name (id=' add' , ctx=Load( ) ), ar
gs= [Num(n=3), Num(n=4) ], keywords=[ ] ) ], keywords=[ ] ) )
] )"
...

In table 1, the root node Module represents the whole code, the list body contains function definition FunctionDef and expression statement Expr. The function definition node has function name name, parameter list args, function body sublist body and return value hint returns. The expression statement includes function call node Call which has function name func and parameter list args.

In compiled embedded Python, the AST of the Python source code is traversed to obtain the semantic information of the program and the corresponding C++ code is generated according to the semantic information. Nodes of the syntax tree which are mainly processed during the traversal and represented content thereof are shown in table 2.

TABLE 2

Type of nodes of Python AST and represented content

| Statement node name | Represented content | Expression node name | Represented content |
|---|---|---|---|
| Import | Module importing statement | Compare | Comparison operation |
| ImportFrom | Importing specified content from module | BoolOp | Logical operation |
| Continue | Jumping out of current cycle | BinOp | Binary operation |
| Break | Jumping out of whole cycle | UaryOp | Unary operation |
| If | Conditional statement | Call | Function call |
| White | While loop statement | Constant | Number, character string, Boolean constant |
| For | For loop statement | List | List constant |
| FunctionDef | Functional defining statement | Tuple | Tuple constant |
| Expr | Expression statement | Dict | Dictionary constant |
| Assign | Assignment statement | Set | Set constant |
| AugAssign | Assignment with operation | Subscript | Slicing operation |
| AnnAssign | Annotated assignment | Name | Identifier |
| Return | Return statement | Attribute | Identifier with action scope |

Step S2: performing type hinting on the Python source code to generate a variable definition and a function definition of C++.

Type hinting (also called type prompting or type annotation) is syntax added after Python3.5, in which type information of variables or functions is written into the source code, such that the type information can be read directly without complicated derivation in a semantic analysis stage. This function is intended to open a Python code to simplify static analysis of programs, a type check during runtime, and generation of other codes from the type information.

The type hinting includes variable hinting and function hinting. The variable hinting means that a type of a single variable is given while a value is assigned to the variable, and such an assignment statement is also called an annotated assignment statement. The function hinting means that a type of a parameter and a type of a return value are given when a function is defined. Table 3 gives examples of the type hinting, one is the variable hinting for int type variable x, and the other is the function hinting for function func with return value int and parameter int.

TABLE 3

Type hinting example
Type hinting

| | |
|---|---|
| x:int=1 | #variable hinting |
| def func(arg:int)->int:<br>    return 1 | #function hinting |

In compiled embedded Python, the type hinting is utilized to generate the variable definition and the function definition of C++. It is required that the variable hinting must be used when a variable occurs for the first time, so as to generate a corresponding C++ variable definition statement. It is required that the function hinting must be used for a function, so as to generate a function definition and declaration with parameter and return value types corresponding to hinting content.

Compiled embedded Python requires that the type of a variable is defined before in use, and the function hinting must be used for a function, as shown in Table 3, and corresponding syntax is described as follows:

$$V ::= va{:}type = value,$$
$$F ::= def\ func(arg_1\ {:}type_{a_1}, ...., arg_n\ {:}type_{a_n})\text{->}$$
$$(type_{r_1}, ...., type_{r_m}){:}\backslash nstmt\_list,$$
$$type ::= B\ |\ Dict[B_1, B_2]\ |\ Set[B]$$
$$|\ List[B]\ |\ Tuple[B],$$
$$B ::= int|float|str|bool|bytes$$

wherein V is annotated assignment statement syntax used to define variable va; F is definition syntax for the function func, stmt_list is a function body, $arg_1$: $type_{a_1}$~$arg_n$: $type_{a_n}$ is a parameter list, and $type_{r_1}$~$type_{r_m}$ is the type of a return value; type and B define types which can be used.

Step S3: translating the Python source code processed in step S1 and step S2 into a C++ source file using a translator.

A design process of the translator includes three steps, and specific content is as follows.

Step S31: defining a structure of translation content, the structure including a header file containing region, a namespace definition region and a source code region. Commonalities are extracted between an execution flow of a Python code and an execution flow of C++, and the structure of the translation content can be divided into three parts: the header file containing region, the namespace definition region and the source code region, as shown in Table 4. "Builtin.h" must be included in the header file containing region, and declares C++ implementation of built-in functions of Python. A namespace is used to simulate a module of Python. The source code region must contain initialization function <Module>_init( ) of a current module, which is used to store a code translation result in a global action scope in the Python source file.

TABLE 4

Structures of header file and source file

| Structure of header file | Structure of source file |
| --- | --- |
| //Preventing header file from being contained repeatedly, <Module> representing module name<br>#ifndef \_\_<Module>\_HPP\_<br>#define \_\_<Module>\_HPP\_<br>//========Header file containing region======<br>#include "builtin.h"<br>...<br>//======================<br>//Defining namespace, name of namespace//corresponding to module name<br>namespace <Module> {<br>//====Source code region=========<br>//Global variable declaration<br>...<br>//Declaring module initialization function, external connection of C definition// may not require this function<br>void <Module>\_init( );<br>//Other function declaration<br>...<br>//============================<br>}<br>#endif //!\_\_<Module>\_HPP\_ | //========Header file containing region======<br>#include "<Module>.hpp"<br>//========================<br>//Defining namespace, name of namespace//corresponding to module name<br>namespace <Module> {<br>//========Source code region==========<br>//Global aariable definition<br>...<br>//Module initialization function, external connection of C definition may// not require this function<br>void <Module>\_init( )<br>{<br>    //Code in global action scope<br>}<br>//Other action scope statement<br>...<br>//======<br>} |

Step S32: designing a relationship of mapping from Python types to C++ types. The Python types are divided into two types: basic types and composite types. The basic types include an integer type, a floating-point type, a string, a boolean type, and a byte array. The composite types include a list type, a tuple type, a set type, and a dictionary type. A basic type set is set to T={int, float, str, bytes, bool}, and the relationship of mapping from the Python types to C/C++ is set to f, and shown in Table 5, wherein x, y∈T.

TABLE 5

Basic type mapping relationship

| Type of hint | Type after translation |
| --- | --- |
| int | int |
| float | float |
| str | string |
| bytes | vector<char> |
| bool | bool |
| List[x] (list type) | vector<f(x)> |
| Tuple[x] (tuple type) | vector<f(x)> |
| Set[x] (set type) | set<f(x)> |
| Dict[x,y] (dictionary type) | map<f(x),f(y)> |

Step S33: using a bottom-up method to semantically analyze the ASR and generate C++ codes, and splicing the generated C++ codes according to the structure of the translation content. The translation process is a process of semantically analyzing the syntax tree from bottom to top and generating the C++ codes, and the generated codes are finally spliced according to the content structure of a translation file. According to the node types given in Table 2, the translation process can be divided into two processes: translation of expression nodes and translation of statement nodes. This step specifically includes two steps, and specific content is as follows.

Step S331: performing expression translation in a manner of accessing child nodes from bottom to top. The expression translation is the basis of the statement translation, and in the expression translation, a Python expression forming a certain statement is translated into a C++ expression which is returned to the statement translation process. Table 1 describes the types of Python expression nodes, and a formal description of expression expr is shown below.

```
expr ::= Compare | BoolOp | BinOp | UnaryOp
       | Constant | Call | List | Tuple | Dict | Set
       | Subscript | Name | Attribute
Compare ::= expr₁ cop expr₂ ,
    where cop ::=>|<|>=|<=|==| ! =
BoolOp ::= expr₁ bop expr₂ , where bop ::= and | or
BinOp ::= expr₁ dop expr₂ ,
    where dop ::= + | - | * | / | ** | // |<<|>>| & | ^ | \ | | %
UnaryOp ::= uop expr₁, where uop ::= not | ~|+| -
Call ::= func{expr₁, ..., exprₙ},
    where func ::= Name | Attribute
List ::= [exp₁, ..., exprₙ ]
Tuple ::= (expr₁, ..., exprₙ )
Dict ::= {expr₁₁ : expr₁₂ ,..., exprₙ₁ : exprn₂ }
Set ::= {exp₁, ..., exprₙ }
Subscript ::= expr[sub],
    where sub ::= expr | expr₁ : expr₂ | expr₁ : expr₂ : expr₃
Name ::= [_a-zA-Z][_a-zA-z0-9]*
Attribute ::= Attribute.Name | Name
```

Since an expression has a recursive definition, the translation process thereof is a bottom-up child-node accessing process. If an expression translation function is named visit\_expr, the function has content of substituting incoming expression node parameters into an access function of a corresponding type, as shown in Table 6.

TABLE 6

Expression translation pseudocode
Expression translation function visit\_expr pseudocode

| | |
| --- | --- |
| 1 | function visit\_expr(TreeNode N) |
| 2 | if type(N) is Constant then |
| 3 |    result←visit\_const(N)   //accessing basic type constant node |
| 4 | else if type(N) is (Name | Attribute) then |
| 5 |    result←visit\_id(N)   //accessing identifier node |
| 6 | else if type(N) is (Compare|BoolOp|BinOp|UaryOp) then |

TABLE 6-continued

Expression translation pseudocode
Expression translation function visit_expr pseudocode

| | |
|---|---|
| 7 | result←visit_Op(N)   //accessing operation node |
| 8 | else if type(N) is (List\|Tuple) then |
| 9 | result←visit_List(N)   //accessing list and tuple node |
| 10 | else if type(N) is Set then |
| 11 | result←visit_Set(N)   //accessing set node |
| 12 | else if type(N) is Dict then |
| 13 | result←visit_Dict(N)   //accessing dictionary node |
| 14 | else if type(N) is Call then |
| 15 | result←visit_Call(N)   //accessing function call node |
| 16 | else if type(N) is Subscript then |
| 17 | result←visit_Sub(N)   //accessing slicing operation node |
| 18 | end if |
| 19 | return result |

Due to space limitations, the translation process of specific types of expressions will not be described in detail.

Step S332: translating a statement or/and each program code line in a statement list into a C++ code statement. A statement is an ordered arrangement of keywords and expressions and is used to represent an operation performed by a program. Therefore, the statement translation process is recombination of expressions and keywords according to the content of the nodes of the syntax tree. Common statements in Python include an assignment statement, a program structure control statement, a function definition statement, a module import statement and an expression statement. A single statement of Python is set to stmt, a statement block is set to stmt_list, a carriage return/line feed character is set to \n, and formal descriptions of the statement and the statement list are as follows.

```
stmt ::= Import | ImportFrom | Continue | Break | If
    | While | For | FunctionDef | Expr | Assign
    | AugAssign | AnnAssign | Return
stmt_list ::= stmt\nstmt_list | stmt
type ::= typeid | Dict[typeid_1, typeid_2 ] | Set[typeid]
    | List[typeid] | Tuple[typeid]
typeid ::= int|float|str|bool|bytes
Import ::= import m_1,...,m_n,
    where m ::= Name
ImportFrom ::= from m import c_1,...,c_n,
    where m ::= Name, c ::= Name
Continue ::= continue
Break ::= break
If ::= if expr: stmt_list_1 else: stmt_list_2
    | if expr: stmt_list
While ::= while expr: stmt_list
For ::= for expr_1 in expry_2 : stmt_list
FunctionDef ::= def func{arg_1:type_{a1},...,arg_n:type_{an})->
        (type_{r1},...,type_{rm} ):stmt_list,
    where arg ::= Name
Expr ::= expr
Assign ::= id_1 ,..., id_n = expr_1 ,..., expr_k,
    where id ::= Name|Attribute, k <= n
AugAssign ::= id op = expr ,
    where op ::= +|−|*|/|//|**|<<|>>|%|&|^|or
AnnAssign ::= id:type = expr ,
    where id ::= Name
Return ::= return expr_1 , expr_2 ,...,expr_n
```

In the translation process of this step, the statements are required to be first divided into a function definition statement and a non-function definition statement, a C++ code statement into which the function definition statement is translated correspondingly is imported into other action scope statement regions, and a C++ code statement into which the non-function definition statement is translated correspondingly is imported into a function body of the action scope where it is located. A statement translation function is named visit_stmt, input is statement list L, output is function definition translation list func_result and other-statement translation list other, and a pseudocode description thereof is shown in Table 7.

TABLE 7

Statement translation pseudocode

| | |
|---|---|
| 1 | function visit_stmt(stmt_list L) |
| 2 | for i←0 to len(L) |
| 3 | if type(L[i]) is Import then |
| 4 | result←visit_import(L[i])   //accessing module importing node |
| 5 | else if type(L[i]) is ImportFrom then |
| 6 | result←visit_importfrom(L[i])   //accessing member importing node |
| 7 | else if type(L[i]) is Continue then |
| 8 | result←continue;   //passing to continue; |
| 9 | else if type(L[i]) is Break then |
| 10 | result←break;   //passing to break; |
| 11 | else if type(L[i]) is If then |
| 12 | result←visit_if(L[i])   //accessing if node |
| 13 | else if type(L[i]) is While then |
| 14 | result←visit_while(L[i])   //accessing while node |
| 15 | else if type(L[i]) is For then |
| 16 | result←visit_for(L[i])   //accessing for node |
| 17 | else if type(L[i]) is Expr then |
| 18 | result←visit_expr(L[i]); //directly translating expression and adding semicolon |
| 19 | else if type(L[i]) is Assign then |
| 20 | result←visit_assign(L[i]);   //accessing assignment node |
| 21 | else if type(L[i]) is AugAssign then |
| 22 | result←visit_augassign(L[i]);   //accessing assignment node with operation |
| 23 | else if type(L[i]) is AnnAssign then |
| 24 | result←visit_AnnAssign(L[i]); //accessing assignment with type hint |
| 25 | else if type(L[i]) is FunctionDef then |

TABLE 7-continued

| | Statement translation pseudocode |
|---|---|
| 26 | result←visit_functiondef(L[i])   //accessing function definition node |
| 27 | end if |
| 28 | if type(L[i]) is FunctionDef then |
| 29 | func_result←func_result& result |
| 30 | else |
| 31 | other←other& result |
| 32 | end if |
| 33 | end for |
| 34 | return other, func_result |

Due to space limitations, the embodiment of the present invention mainly describes translation processes of a flow control statement and a function definition statement.

1. Translation of Flow Control Statement

Program structures of Python are divided into three categories: a sequential structure, a selective structure and a loop structure. The sequential structure means that two line statements are executed from top to bottom. The selective structure allows a branch program of a program to be executed according to a certain condition, and is the if statement in Python, and a switch statement is omitted compared with C++. The loop structure allows a code segment of a program to be executed repeatedly within a certain condition, and in Python, there exist two kinds of loops: while and for. A method for translating the selective structure and the loop structure from Python syntax to C++ syntax is described below.

The if statement is formed by three parts: a branch condition, an if body code block and an else code block. The branch condition is an expression, and the body code block and the else code block are both statement lists.

When the if statement is translated, the branch condition, the code block body, and the else code block orelse are required to be substituted into a corresponding translation function, and then, translation results are spliced according to the C++ syntax. For any if statement node i, translation process function visit if may be described as:

$$\forall i \in \text{If} \rightarrow \\ c \leftarrow \text{visit\_expr(condition)}, \\ b \leftarrow \text{visit\_stmt(body)}, \\ o \leftarrow \text{visit\_stmt(orelse)}, \\ \text{visit\_if (i)} = \begin{cases} \text{if(c)\{b\}else\{o\}}, o \neq \varepsilon \\ \text{if(c)\{b\}}, o = \varepsilon \end{cases}$$

A while statement is formed by a loop control condition and a loop body code block. The loop control condition is an expression and the loop body code block is a statement list.

When the while statement is translated, the loop condition and the loop body code block body are required to be substituted into a corresponding translation function, and then, translation results are spliced according to the C++ syntax. For any while statement node w, translation process function visit while may be described as:

$$\forall w \in \text{While} \rightarrow \\ c \leftarrow \text{visit\_expr (condition)}, \\ b \leftarrow \text{visit\_stmt (body)}, \\ \text{visit\_while(w)} = \text{while(c)\{b\}}$$

A for statement is formed by a loop variable, a sequence object, and a loop body code block. The loop variable and the sequence object are both expressions, and the loop body code block is a statement list.

The loop realizes looping from a first element to a last element of the sequence object seq, and during each loop, the loop variable iter is used to represent a current element, which is similar to a C++ iterator. Since a sequence type is represented using an STL container type after translation, the for statement also belongs to syntax for translation to the C++ iterator. For any for statement node f, translation process function visit for may be described as:

$$\forall f \in \text{For} \rightarrow \\ i \leftarrow \text{visit\_expr(iter)}, \\ s \leftarrow \text{visit\_expr(seq)}, \\ b \leftarrow \text{visit\_stmt(body)}, \\ \text{visit\_for (f)} = \text{for(auto i=s.begin( );i!=s.end( );i++)\{b\}}$$

2. Translation of Function Definition

The function definition is formed by function name func, parameter list args, return value hint returns and function content body, and embedded Python requires that type hints must be added to both parameters and return values, and therefore, the function definition may be described as:

$$\text{FunctionDef} := \text{def func}\{\text{arg}_1 : \text{type}_{a1}, ..., \text{arg}_n : \text{type}_{an}\} \rightarrow \\ (\text{type}_{r1}, ..., \text{type}_{rm}):\backslash n\text{stmt\_list}, \\ \text{arg} := \text{Name}, \\ \text{type} ::= \text{typeid} \mid \text{Dict[typeid}_1, \text{typeid}_2] \mid \text{Set[typeid]} \\ \mid \text{List[typeid]} \mid \text{Tuple[typeaid]}, \\ \text{typeid} ::= \text{int|float|str|bool|bytes}$$

wherein arg1: type a1 to argn: type an are parameter lists, and typer1 to typerm are return value hints.

The translation of the function definition requires that a first return value type is taken as a function type, and a reference type corresponding to a later return value type is inserted into the parameter list. The parameter types after mapping according to a basic type mapping relationship are set to ta1 to tan, the return value types are set to tr1 to trn, f.stmt_list is a statement block in the function, and translation function visit func for the function definition may be described as:

$$\forall f \in \text{FunctionDef} \rightarrow s \leftarrow \text{visit\_stmt}(f.\text{stmt\_list})$$

$$\text{visit\_func}(f) = \begin{cases} \text{void Py\_func}(t_{a1}\text{Py\_arg}_1, ..., t_{an} \text{Py\_arg}_n)\{s\}, m = 0 \\ t_{r1} \text{ Py\_func}(t_{a1}\text{Py\_arg}_1, ..., t_{an} \text{Py\_arg}_n)\{s\}, m = 1 \\ t_{r1} \text{ Py\_func}(t_{a1} \text{Py\_arg}_1, ..., t_{an} \text{Py\_arg}_n, \\ \quad t_{r2} \& rt_1, ..., t_{rm} \& rt_{m-1})\{s\}, m > 1 \end{cases}$$

Step S4: storing the C++ source file and a file related to an embedded chip together to form a file package, and compiling and linking the file package to generate an ASCII text file.

With the method for implementing compiled embedded Python according to the embodiment of the present invention, a source code translator is implemented based on the type hinting and the static analysis, and integrated into an embedded platform, so as to edit, compile, link and burn the Python source file, and break through a defect that Python may not be applied to the field of the embedded platforms in real time in a prior art.

Since Python does not have a pointer operation function and a memory cannot be directly accessed according to an address, Python realizes an IO operation by means of a module packaged by C or other languages. The IO operation is the basis of an embedded application, and therefore, a C/C++-mixed programming method must be designed, so as to implement the IO operation of embedded Python.

During implementation of the IO operation, a specific process of a declaration rule of a function and a variable is as follows: the function and the variable are required to be declared using a Python source file, content of a first line of the file is "#Extern Definition", and when the translator encounters such a source file, the translator only generates an identifier information table for the source file without translating the content. Declarative syntax for the function and the variable is required to conform to F and V in the function hint in compiled embedded Python above, and content of the function body is "pass" indicating empty content. If the Python source file (module) for storing function and variable declarations is named Module.py, content C thereof may be described as follows:

$$C ::= \text{\#Extern Definition} \backslash n S,$$
$$S ::= DS \mid D, D ::= F \mid V$$

During the implementation of the IO operation, a specific process of an implementation rule of the function and the variable is as follows: the function and the variable are implemented using C++ syntax, a file with extension ".cpp" is required to be used as the source file, and a file with file name "Module.hpp" is required to be used as the header file.

(1) Variable

A global variable is implemented by adding prefix "Py_" to the variable declared in Module.py according to the C++ syntax. If Module.py has variable declaration V with name v, the type hint thereof is type, and t is obtained after type mapping, content E of the variable in Module.hpp and content T of the variable in the source file may be described as:

$$E ::= \text{extern } t \text{ Py\_v};$$
$$T ::= t \text{ Py\_v};$$

(2) Function

The function is implemented by adding prefix "Py_" to the function name and the parameter name, taking the first return value as the function type, and adding the reference types of the second and subsequent return values to the parameter list.

If Module.py has function declaration F with function name func, has k parameters arg1 to argk with types t1 to tk after mapping, and has z return values with types r1 to rz after mapping, and function content is S (written using C++), function declaration H required in Module.hpp and function implementation C required in the source file may be described as:

$$H ::= D;$$

$$C ::= D\{S\}$$

$$D ::= \begin{cases} \text{void Py\_func}(t_1 \text{ Py\_arg}_1, \ldots, t_k \text{ Py\_arg}_k), z = 0 \\ r_1 \text{ Py\_func}(t_1 \text{ Py\_arg}_1, \ldots, t_k \text{ Py\_arg}_k), z = 1 \\ r_1 \text{ Py\_func}(t_1 \text{ Py\_arg}_1, \ldots, t_k \text{ Py\_arg}_k, \\ \quad r_2 \& rt1, \ldots, r_z \& rtz - 1), z > 1 \end{cases}$$

After the implementation content of the function and the variable are determined, the content is finally arranged according to the structure of the translation file, and the C++ implementation part of hybrid programming is completed. Table 5 describes content of the source file and Module.hpp, & represents the AND operation of the grammar, and includes is a list of header file statements required to be contained by functions and variables defined in other files used in hybrid programming.

TABLE 8

C++ implementation content for hybrid programming

| Content of source file | Content of Module.hpp |
|---|---|
| //include "Module.hpp" | #ifndef_Module_HPP |
| namespace Module{ | #define_Module_HPP |
|   vlist | includes |
|   flist | namespace Module{ |
| } |   vlist |
| vlist ::= $T_1$ & ... & $T_n$ |   flist |
| flist ::= $C_1$ & ... & $C_m$ | } |
| | #endif |
| | vlist ::= $E_1$ & ... & $E_n$ |
| | flist ::= $H_1$ & ... & $H_m$ |

In the embodiment of the present invention, the ASCII text file is also applied to an embedded platform for an experiment. In the experiment, the embedded platform is STM32L431RC which is a hardware platform, an operating system API of RT-Thread is provided for embedded Python using a hybrid programming method, and three small lights flicker in the real-time operating system environment.

STM32L431 is a 32-bit reduced instruction set ultra-low power consumption microcontroller based on a high performance Cortex-M4 core, and has an operating frequency up to 80 MHz. STM32L431 has 256 KB Flash and a 64 KB RAM and provides a low power consumption RTC, a universal 32-bit timer, a 16-bit PWM timer dedicated to motor control, four universal 16-bit timers and two 16-bit low power consumption timers.

The experiment achieves a function that under the RT-Thread system environment, a main thread creates three threads for a red light, a green light and a blue light, the three threads control colors of the three-color lights, and brightness states of the small lights are sent to a PC through a UART.

Figure 4:
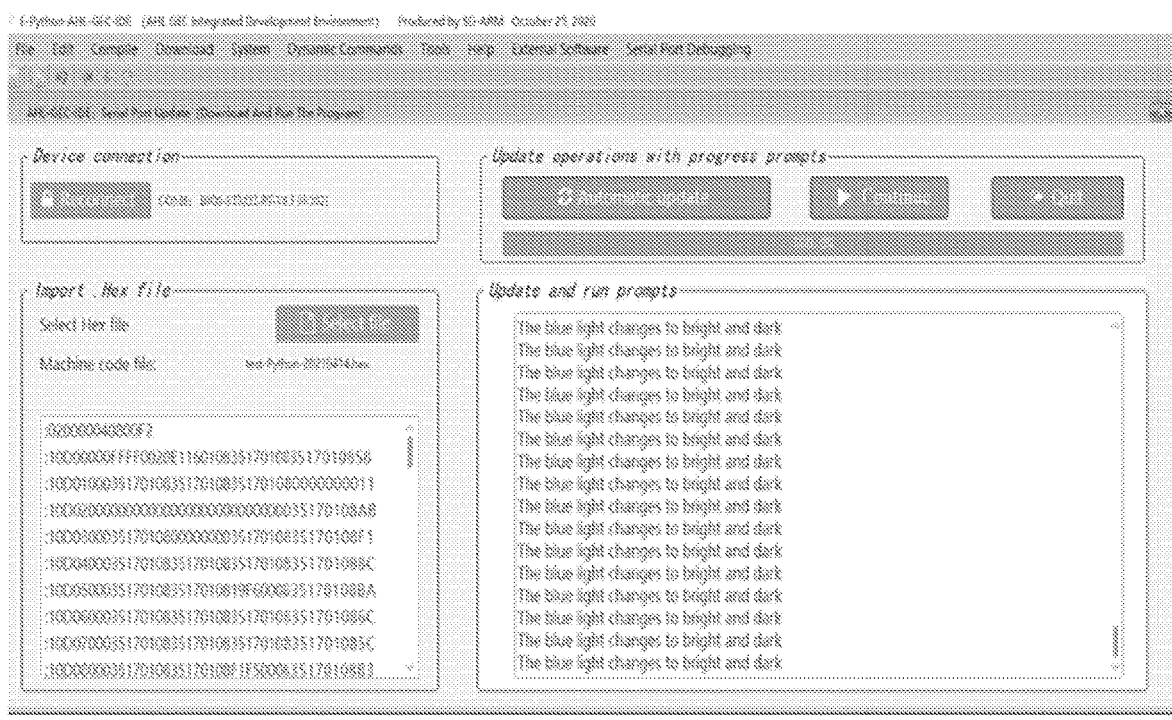
FIG. 4 is a schematic diagram of an interface after luminance change information is received by a serial port in the embodiment shown in FIG. 3.

In the experiment, a modified version, E-Python-AHL-GEC-IDE, of the embedded development integrated development environment AHL-GEC-IDE which is produced jointly by Suzhou university and ARM is used as the development environment, and programs are written and burnt on a target board, as shown in FIG. 3. After compilation is successful, the program is updated and burnt to STM32 using a serial port to run, and it may be observed that the three threads are alternately executed, brightness of the small lights is alternately changed, and brightness state change information is sent to an upper computer, as shown in FIG. 4.

The experiment effectively proves that the method for implementing compiled embedded Python according to the embodiment of the present invention may be implemented on an embedded platform and can meet real-time requirements of the embedded platform.

It will be evident to those skilled in the art that the invention is not limited to the details of the foregoing illustrative embodiments, and that the present invention may be embodied in other specific forms without departing from the spirit or essential attributes thereof. The embodiments are therefore to be considered in all respects as illustrative and not restrictive, the scope of the invention is defined by the appended claims rather than by the foregoing description, and all changes which come within the meaning and range of equivalency of the claims are therefore intended to be embraced therein. Any reference numeral in a claim should not be construed as limiting the claim concerned.

Furthermore, it should be understood that although the specification is described in terms of the embodiments, not every embodiment only includes an independent technical solution, and such description of the specification is for clarity only; those skilled in the art should take the specification as a whole, and the technical solutions in various embodiments may also be appropriately combined to form other embodiments that may be understood by those skilled in the art.

What is claimed is:

1. A method for implementing compiled embedded Python, comprising:
    step S1: traversing an abstract syntax tree of a Python source code to obtain semantic information of a program and generating corresponding C++ codes according to the semantic information;
    step S2: performing type hinting on the Python source code to generate a variable definition and a function definition of the C++ codes;
    step S3: translating the Python source code processed in step S1 and step S2 into a C++ source file using a translator; and
    step S4: storing the C++ source file and a file related to an embedded chip together to form a file package, and compiling and linking the file package to generate an ASCII text file,
    wherein a design process of the translator comprises:
    step S31: defining a structure of translation content, the structure comprising a header file containing region, a namespace definition region and a source code region;
    step S32: designing a relationship of mapping from Python types to C++ types; and
    step S33: using a bottom-up method to semantically analyze the abstract syntax tree and the generated C++ codes, and splicing the generated C++ codes according to the structure of the translation content, and
    wherein the step S33 comprises:
    step S331: performing expression translation in a manner of accessing child nodes from bottom to top; and
    step S332: translating a statement or/and each program code line in a statement list into a C++ code statement.

2. The method for implementing compiled embedded Python according to claim 1, wherein the file related to an embedded chip comprises a header file, a start-up file and a link file.

3. The method for implementing compiled embedded Python according to claim 1, wherein the type hinting comprises variable hinting and function hinting,
    the variable hinting comprises the steps of: giving a type of a single variable in the Python source code while assigning a value to the variable, so as to generate a corresponding C++ variable definition; and
    the function hinting comprises the steps of: giving a type of a parameter in a function in the Python source code and a type of a return value of the function while defining the function, so as to generate a corresponding C++ function definition.

4. The method for implementing compiled embedded Python according to claim 1, wherein the mapping relationship is shown in the following table, x, y $\in T$, and T={int, float, str, bytes, bool},

| Type of hint | Type after translation |
| --- | --- |
| int | int |
| float | float |
| str | string |
| bytes | vector<char> |
| bool | bool |
| List[x] (list type) | vector<f(x)> |
| Tuple[x] (tuple type) | vector<f(x)> |
| Set[x] (set type) | set<f(x)> |
| Dict[x,y] (dictionary type) | map<f(x),f(y)>. |

5. The method for implementing compiled embedded Python according to claim 1, wherein in the translation process of the step S332, the statement is required to be first divided into a function definition statement and a non-function definition statement, a first C++ code statement into which the function definition statement is translated correspondingly is imported into other action scope statement regions, and a second C++ code statement into which the non-function definition statement is translated correspondingly is imported into a function body of the action scope where it is located.

6. The method for implementing compiled embedded Python according to claim 1, wherein the abstract syntax tree is a list of node objects, each object comprises a number of sub-lists or reference to other objects, and each list or sub-list comprises any number of node objects.

7. The method for implementing compiled embedded Python according to claim 6, wherein a process of obtaining the abstract syntax tree of the Python source code comprises the steps of: calling a parse( ) function of an abstract syntax tree module, and using a dump( ) function to convert the abstract syntax tree of the Python source code obtained by the parse( ) function into a natural language form.

8. The method for implementing compiled embedded Python according to claim 1, wherein when the ASCII text file is applied to an embedded platform, a C or other-language encapsulation module is used to implement an IO (input output) operation.

* * * * *